(12) United States Patent
McEvoy et al.

(10) Patent No.: US 10,132,422 B2
(45) Date of Patent: Nov. 20, 2018

(54) COMPOUND EXPRESS ACTUATOR CONNECTION

(71) Applicant: GE Oil & Gas Pressure Control LP, Houston, TX (US)

(72) Inventors: Travis Kyle McEvoy, Houston, TX (US); Robert Kevin Law, Richmond, TX (US); Keith M. Adams, Katy, TX (US); Lloyd R. Cheatham, Lake Jackson, TX (US)

(73) Assignee: GE Oil & Gas Pressure Control LP, Houston, TX (US)

( * ) Notice: Subject to any disclaimer, the term of this patent is extended or adjusted under 35 U.S.C. 154(b) by 0 days.

(21) Appl. No.: 15/175,122

(22) Filed: Jun. 7, 2016

(65) Prior Publication Data
US 2016/0281876 A1    Sep. 29, 2016

Related U.S. Application Data (63) Continuation-in-part of application No. 14/949,324, filed on Nov. 23, 2015, now Pat. No. 9,759,240, (Continued)

(51) Int. Cl.
*F16K 31/12* (2006.01)
*F16K 31/122* (2006.01)
(Continued)

(52) U.S. Cl.
CPC .......... *F16K 31/1228* (2013.01); *F16K 27/00* (2013.01); *F16K 31/1221* (2013.01);
(Continued)

(58) Field of Classification Search
None
See application file for complete search history.

(56) References Cited

U.S. PATENT DOCUMENTS 2,610,820 A    9/1952 Markel
2,953,166 A    9/1960 Carlson, Jr.
(Continued)

FOREIGN PATENT DOCUMENTS

CN    2121592 U    11/1992
CN    101093034 A    12/2007
(Continued)

OTHER PUBLICATIONS

PCT International Preliminary Report on Patentability issued in connection with corresponding PCT Application No. PCT/US2016/036328 dated Dec. 12, 2017.*
(Continued)

*Primary Examiner* — Matthew W Jellett
(74) *Attorney, Agent, or Firm* — Hogan Lovells US LLP (57) ABSTRACT

A system for securing a valve actuator to a valve assembly includes an actuator housing with a plurality of housing lugs protruding radially. A cylinder assembly is located within the actuator housing and has a horseshoe connector to engage a valve stem nub of a valve stem and transfer axial movement of the horseshoe connector to axial movement of the valve stem. A bonnet has a plurality of bonnet lugs protruding radially from the bonnet to define a plurality of bonnet slots therebetween, wherein each of the plurality of housing lugs are sized to pass axially through a respective one of the plurality of bonnet slots when the actuator housing is in a released position, the actuator housing being rotatable to a locked position such that the plurality of bonnet lugs prevent axial movement of the actuator housing in at least one direction.

21 Claims, 6 Drawing Sheets

Related U.S. Application Data which is a continuation-in-part of application No. 13/832,884, filed on Mar. 15, 2013, now Pat. No. 9,212,758.

(60) Provisional application No. 62/172,644, filed on Jun. 8, 2015, provisional application No. 61/747,479, filed on Dec. 31, 2012.

(51) Int. Cl.
  *F16K 27/00* (2006.01)
  *F16K 37/00* (2006.01)
  *F16K 31/126* (2006.01)
  *F16K 35/06* (2006.01)
  *F16K 35/08* (2006.01)

(52) U.S. Cl.
  CPC ...... *F16K 37/0008* (2013.01); *F16K 31/1262* (2013.01); *F16K 35/06* (2013.01); *F16K 35/08* (2013.01); *Y10T 137/6065* (2015.04)

(56) References Cited

U.S. PATENT DOCUMENTS

| | | | |
|---|---|---|---|
| 3,082,792 A | 3/1963 | Jenkins | |
| 3,115,068 A | 12/1963 | Lofink | |
| 3,139,898 A | 7/1964 | Wiltgen | |
| 3,146,682 A | 9/1964 | Price et al. | |
| 3,175,473 A | 3/1965 | Boteler et al. | |
| 3,293,992 A | 12/1966 | Baumann | |
| 3,380,470 A | 4/1968 | Culpepper, Jr. et al. | |
| 3,593,959 A | 7/1971 | Greene | |
| 3,792,717 A | 2/1974 | Tibbals | |
| 3,811,457 A | 5/1974 | Crossman | |
| 3,882,400 A | 5/1975 | Lewis | |
| 3,955,793 A | 5/1976 | Burkhardt et al. | |
| 3,958,592 A | 5/1976 | Wells | |
| 3,993,284 A | 11/1976 | Lukens, Jr. | |
| 4,135,546 A | 1/1979 | Morrison | |
| 4,135,547 A | 1/1979 | Akkerman | |
| 4,187,764 A | 2/1980 | Cho | |
| 4,274,432 A | 6/1981 | Tunstall et al. | |
| 4,309,022 A | 1/1982 | Reinicket et al. | |
| 4,354,425 A | 10/1982 | Bruton et al. | |
| 4,424,738 A | 1/1984 | Leighton | |
| 4,480,811 A | 11/1984 | Card et al. | |
| 4,489,756 A | 12/1984 | Balz | |
| 4,491,060 A | 1/1985 | Boski | |
| 4,527,769 A | 7/1985 | Stogner et al. | |
| 4,529,330 A | 7/1985 | Boski | |
| 4,585,207 A | 4/1986 | Shelton | |
| 4,620,562 A | 11/1986 | Pacht | |
| 4,624,442 A | 11/1986 | Duffy et al. | |
| 4,633,898 A | 1/1987 | Denk | |
| 4,650,151 A | 3/1987 | McIntyre | |
| 4,721,284 A | 1/1988 | Bankard | |
| 4,768,545 A | 9/1988 | Hoffman | |
| 4,871,143 A | 10/1989 | Baker | |
| 4,934,403 A | 6/1990 | Mooney et al. | |
| 4,967,785 A | 11/1990 | Young | |
| 5,067,392 A | 11/1991 | Gautier | |
| 5,294,090 A | 3/1994 | Winnike | |
| 5,464,040 A | 11/1995 | Johnson | |
| 5,499,648 A | 3/1996 | Powell et al. | |
| 5,964,446 A | 10/1999 | Walton et al. | |
| 6,015,134 A | 1/2000 | Johnson | |
| 6,041,804 A * | 3/2000 | Chatufale | E21B 34/04 137/15.23 |
| 6,050,541 A | 4/2000 | Chatufale | |
| 6,086,039 A | 7/2000 | Sievers et al. | |
| 6,089,531 A | 7/2000 | Young | |
| 6,397,892 B1 | 6/2002 | Pyle et al. | |
| 6,487,960 B1 | 12/2002 | Chatufale | |
| 6,659,419 B2 * | 12/2003 | Chatufale | F16K 3/0254 222/334 |
| 6,672,331 B2 | 1/2004 | Heald | |
| 6,684,897 B2 | 2/2004 | Sundararajan | |
| 6,854,704 B1 | 2/2005 | Young | |
| 7,124,774 B2 | 10/2006 | Weingarten | |
| 7,159,839 B2 | 1/2007 | Tanikawa et al. | |
| 7,647,861 B2 | 1/2010 | Bessman | |
| 8,282,070 B2 | 10/2012 | Davies, Jr. | |
| 8,322,359 B2 | 12/2012 | Zecchi et al. | |
| 8,708,309 B2 | 4/2014 | Roper et al. | |
| 8,864,102 B2 | 10/2014 | Gamache | |
| 9,033,308 B2 | 5/2015 | Kiesbauer et al. | |
| 9,212,758 B2 | 12/2015 | Adams et al. | |
| 2002/0175303 A1 | 11/2002 | Chatufale | |
| 2003/0034465 A1 | 2/2003 | Adams et al. | |
| 2004/0007682 A1 | 1/2004 | Kajitani | |
| 2004/0154467 A1 | 8/2004 | Engle et al. | |
| 2005/0087712 A1 | 4/2005 | Lymberopoulos | |
| 2007/0290154 A1 | 12/2007 | Aoyama | |
| 2011/0240126 A1 | 10/2011 | Lymberopoulos et al. | |
| 2012/0227983 A1 | 9/2012 | Lymberopoulos et al. | |
| 2012/0318388 A1 | 12/2012 | Du | |
| 2014/0138564 A1 | 5/2014 | Adams et al. | |
| 2014/0174554 A1 | 6/2014 | Meyberg et al. | |
| 2015/0204456 A1 | 7/2015 | Adams et al. | |

FOREIGN PATENT DOCUMENTS

| | | |
|---|---|---|
| CN | 202302237 U | 7/2012 |
| CN | 202432085 U | 9/2012 |
| DE | 102011015646 A1 | 10/2012 |
| EP | 0416966 A2 | 3/1991 |
| EP | 0486824 A1 | 5/1992 |
| FR | 1195213 A | 11/1959 |
| GB | 1148817 A | 4/1969 |
| GB | 2022704 A | 12/1979 |
| GB | 2168787 A | 6/1986 |
| GB | 2303199 A | 2/1997 |
| JP | 2008069795 A | 3/2008 |
| JP | 2010048271 A | 3/2010 |
| WO | 2014099505 A1 | 6/2014 |

OTHER PUBLICATIONS

PCT Search Report and Written Opinion for related application PCT/US2013/077412 dated Mar. 7, 2014.
McEvoy et al., U.S. Appl. No. 14/949,324, filed Nov. 23, 2015.
Adams et al., U.S. Appl. No. 61/747,479, filed Dec. 31, 2012.
Adams et al., U.S. Appl. No. 13/832,884, filed Mar. 15, 2013.
Adams et al., U.S. Appl. No. 61/747,753, filed Dec. 31, 2012.
Cheatham et al., U.S. Appl. No. 62/049,539, filed Sep. 12, 2014.
Adams et al., U.S. Appl. No. 13/717,073, filed Dec. 17, 2012.
McEvoy et al., U.S. Appl. No. 62/172,544, filed Jun. 8, 2015.
Actuators Pressure Control CHA Top Access Standard Hydraulic Actuator, GE Oil & Gas, 2013.
International Search Report and Written Opinion issued in connection with related PCT Application No. PCT/US2013/067666, dated Mar. 3, 2014.
International Search Report and Written Opinion issued in connection with related PCT Application No. PCT/US13/077392, dated Mar. 7, 2014.
Non-Final Rejection towards related U.S. Appl. No. 13/679,553 dated Mar. 28, 2014.
International Search Report and Written Opinion issued in connection with related PCT Application No. PCT/US2013/074223 dated Apr. 3, 2014.
Non-Final Rejection towards related U.S. Appl. No. 13/717,073 dated Jul. 31, 2014.
Non-Final Rejection towards related U.S. Appl. No. 14/107,589 dated Aug. 13, 2014.
Final Rejection towards related U.S. Appl. No. 13/679,553 dated Oct. 17, 2014.
Notice of Allowance issued in connection with related U.S. Appl. No. 13/679,553 dated Nov. 21, 2014.
Non-Final Rejection towards related U.S. Appl. No. 14/673,178 dated Jul. 30, 2015.

(56) References Cited

OTHER PUBLICATIONS

International Search Report and Written Opinion issued in connection with related PCT Application No. PCT/US2015/49556, dated Nov. 19, 2015.
Actuators NoBolt™ Dual Seal Pneumatic Actuator, GE Oil & Gas, 2015.
Office Action issued in connection with related CN Application No. 201380070284.5 dated May 25, 2016.
Office Action issued in connection with related CN Application No. 201380074076.2 dated Jun. 30, 2016.
Office Action issued in connection with related CN Application No. 201380070678.0 dated Jul. 5, 2016.
Non-Final Rejection towards related U.S. Appl. No. 14/673,178 dated Jul. 15, 2016.

* cited by examiner

COMPOUND EXPRESS ACTUATOR CONNECTION

CROSS REFERENCE TO RELATED APPLICATION

This application claims priority to and the benefit of U.S. Provisional Application Ser. No. 62/172,644, filed Jun. 8, 2015, titled "Compound Express Actuator Connection," the full disclosure of which is hereby incorporated herein by reference in its entirety for all purposes.

This application is also a continuation in part of co-pending U.S. application Ser. No. 14/949,324, titled "No-Bolt Security Latching System," filed Nov. 23, 2015, which is a continuation in part of U.S. application Ser. No. 13/832,884, now U.S. Pat. No. 9,212,758, titled "Quick Connect Valve Actuator," filed Mar. 15, 2013, which claims priority to U.S. Provisional Patent Application No. 61/747,479, titled "Quick Connect Valve Actuator," filed on Dec. 31, 2012, the disclosure of each which is incorporated herein by reference in its entirety.

BACKGROUND

1. Field of the Disclosure

This invention relates in general to actuators for actuating valves, and in particular to actuators with a quick connection to both a valve bonnet and a valve stem.

2. Description of Related Art

Valves used in hydrocarbon drilling and production operations can be actuated by a valve actuator. The valve actuator can be a pneumatic, piston, or hydraulic type actuator that moves a stem linearly or rotationally, or both linearly and rotationally, to open or close the valve.

A bonnet is connected to the valve, with the stem extending through the bonnet, and then the actuator is connected to the bonnet. Valve actuators are often connected to the bonnet by threaded connections or by bolts through a flange. Threads are expensive to manufacture and are easily damaged. Threaded connections also have the disadvantage that the inlet of the actuator rotates about the axis of the actuator during installation. If the actuator is fully tightened and the inlet ends up in the wrong location, the operating supply line to the inlet must be moved. Machining bolt holes in the actuator and drilling and tapping holes into an adapter ring or the bonnet is expensive. In addition, bolts can be easily tampered with, leading to safety concerns and a risk of theft.

SUMMARY OF THE DISCLOSURE

Embodiments of this disclosure provide a quick connectable actuator that includes features to quickly connect and disconnect the quick connectable actuator to a valve stem and a bonnet of a valve. Embodiments of the quick connectable actuator decrease the time required to install the actuator onto the bonnet. Additionally, installation of the actuator requires no tooling, except lift assistance when necessary. Embodiments of this disclosure also provide the safety feature of providing for axially independent installation of the actuator onto the valve stem such that the connection can be oriented in the safest manner. Some threaded connections between actuators and bonnets and actuators and valve stems currently used in the industry are more expensive to manufacture, and take longer to make up than the connections described herein. The systems and method described herein therefore reduce installation costs, decrease the duration of time required for installation, reduce the required tooling, and increase the safety of the valve system.

In an embodiment of the current disclosure, a system for securing a valve actuator to a valve assembly includes an actuator housing having an actuator axis, and a plurality of housing lugs spaced apart around a circumference of the actuator housing, the plurality of housing lugs protruding radially to define a plurality of housing slots therebetween. The system further includes a valve stem, a first portion of the valve stem having a valve stem nub with a nub shoulder, and a second portion of the valve stem operable to be connected to a valve. A cylinder assembly is located within the actuator housing, the cylinder assembly having a horseshoe connector with a horseshoe connector opening and a lip adjacent to the opening, the lip sized to engage the nub shoulder, transferring axial movement of the horseshoe connector to axial movement of the valve stem when the valve stem is positioned within the horseshoe connector opening. A bonnet has a plurality of bonnet lugs spaced apart around a circumference of the bonnet. The plurality of bonnet lugs protrude radially from the bonnet to define a plurality of bonnet slots therebetween, wherein each of the plurality of housing lugs are sized to pass axially through a respective one of the plurality of bonnet slots when the actuator housing is in a released position. The actuator housing is rotatable to a locked position where at least a portion of one or more of the plurality of housing lugs is axially aligned with a portion of a respective bonnet lug such that the plurality of bonnet lugs prevent axial movement of the actuator housing in at least one direction.

In an alternate embodiment of this disclosure, a system for securing a valve actuator to a valve assembly includes an actuator housing having an actuator axis, a valve end and an opposite outer end, and a plurality of housing lugs spaced apart around a circumference of the actuator housing, the plurality of housing lugs protruding radially to define a plurality of housing slots therebetween. The system further includes a valve stem, a first portion of the valve stem having a valve stem nub with a nub shoulder, and a second portion of the valve stem operable to be connected to a valve. A cylinder assembly is located within the actuator housing, the cylinder assembly having an inner cylinder sealingly engaging an outer cylinder, the outer cylinder axially moveable relative to the inner cylinder by a change of pressure within a piston chamber of cylinder assembly. A horseshoe connector is located at an end of the outer cylinder, the horseshoe connector having a horseshoe connector opening and a lip adjacent to the opening, the lip sized to engage the nub shoulder, transferring axial movement of the horseshoe connector to axial movement of the valve stem when the valve stem is positioned within the horseshoe connector opening. A bonnet is connectable to the valve end of the actuator housing and has a plurality of bonnet lugs spaced apart around a circumference of the bonnet, the plurality of bonnet lugs protruding radially from the bonnet to define a plurality of bonnet slots therebetween, wherein each of the plurality of housing lugs are sized to pass axially through a respective one of the plurality of bonnet slots when the actuator housing is in a released position. The actuator housing is rotatable to a locked position where at least a portion of one or more of the plurality of housing lugs is axially aligned with a portion of a respective bonnet lug such that the plurality of bonnet lugs prevent axial movement of the actuator housing in at least one direction when the actuator housing is in the locked position.

In yet another embodiment of this disclosure, a method for securing a valve actuator to a valve assembly includes providing an actuator housing having an actuator axis, a plurality of housing lugs spaced apart around a circumference of the actuator housing, the plurality of housing lugs protruding radially to define a plurality of housing slots therebetween, and a cylinder assembly located within the actuator housing, the cylinder assembly having a horseshoe connector. A valve stem nub of a first portion of a valve stem is located within a horseshoe connector opening of the horseshoe connector so that a lip adjacent to the horseshoe connector opening engages a nub shoulder of the valve stem nub and axial movement of the horseshoe connector can be transferred to axial movement of the valve stem. The valve stem has a second portion operable to be connected to a valve. A bonnet having a plurality of bonnet lugs spaced apart around a circumference of the bonnet is provided, the plurality of bonnet lugs protruding radially from the bonnet to define a plurality of bonnet slots therebetween. The plurality of housing lugs are passed through the plurality of bonnet slots and the actuator housing is rotated from a released position to a locked position where at least a portion of one or more of the plurality of housing lugs is axially aligned with a portion of a respective bonnet lug such that the plurality of bonnet lugs prevent axial movement of the actuator housing in at least one direction.

BRIEF DESCRIPTION OF DRAWINGS

Some of the features and benefits of the present disclosure having been stated, others will become apparent as the description proceeds when taken in conjunction with the accompanying drawings, in which.

While the disclosure will be described in connection with the example embodiments, it will be understood that it is not intended to limit the disclosure to that embodiment. On the contrary, it is intended to cover all alternatives, modifications, and equivalents, as may be included within the spirit and scope of the disclosure as defined by the appended claims.

DETAILED DESCRIPTION OF DISCLOSURE

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Figure 1:
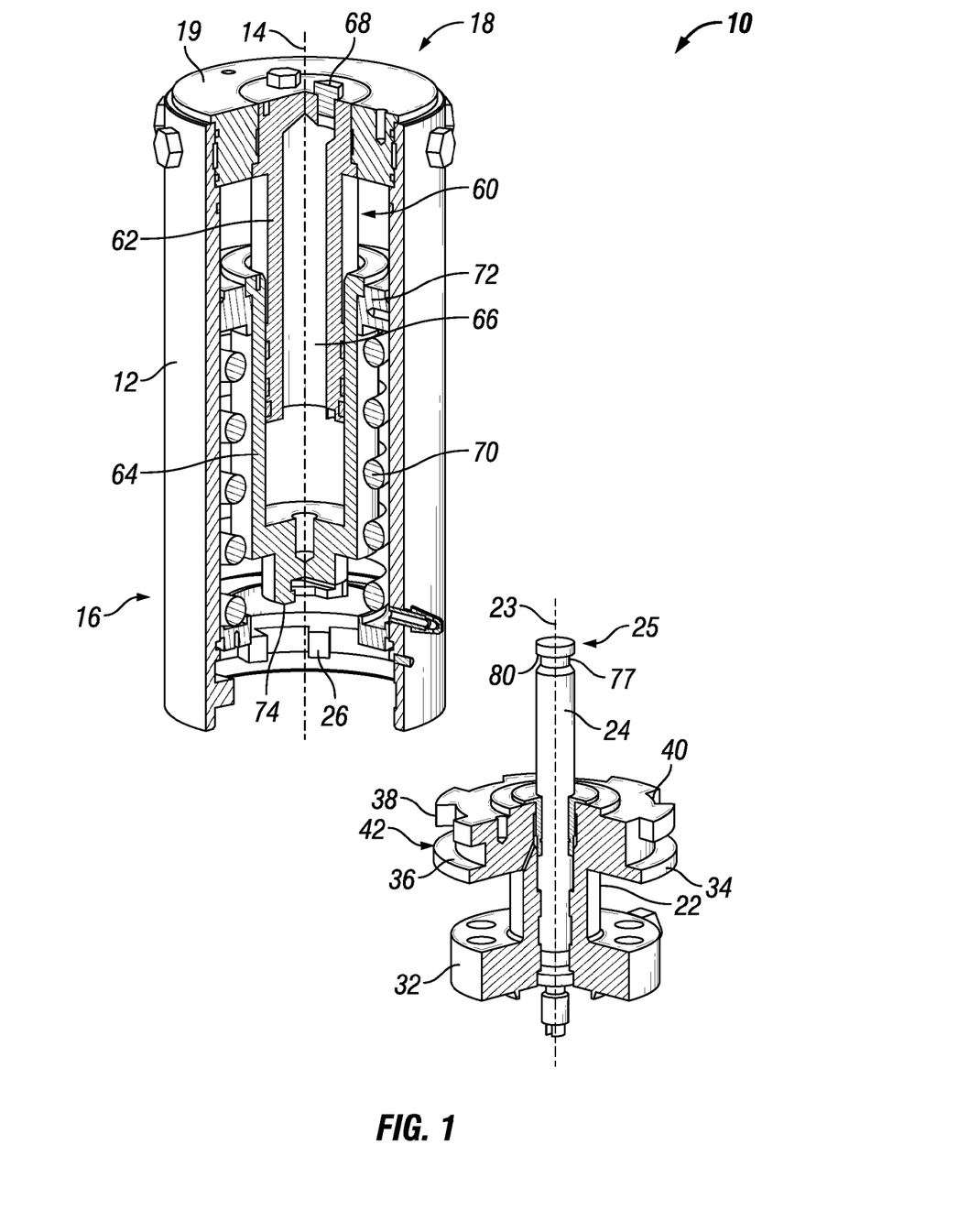
FIG. 1 is a quarter section perspective view of a quick connectable actuator in accordance with an embodiment of this disclosure, shown with the quick connectable actuator unattached from a bonnet and valve stem.
Figure 3:
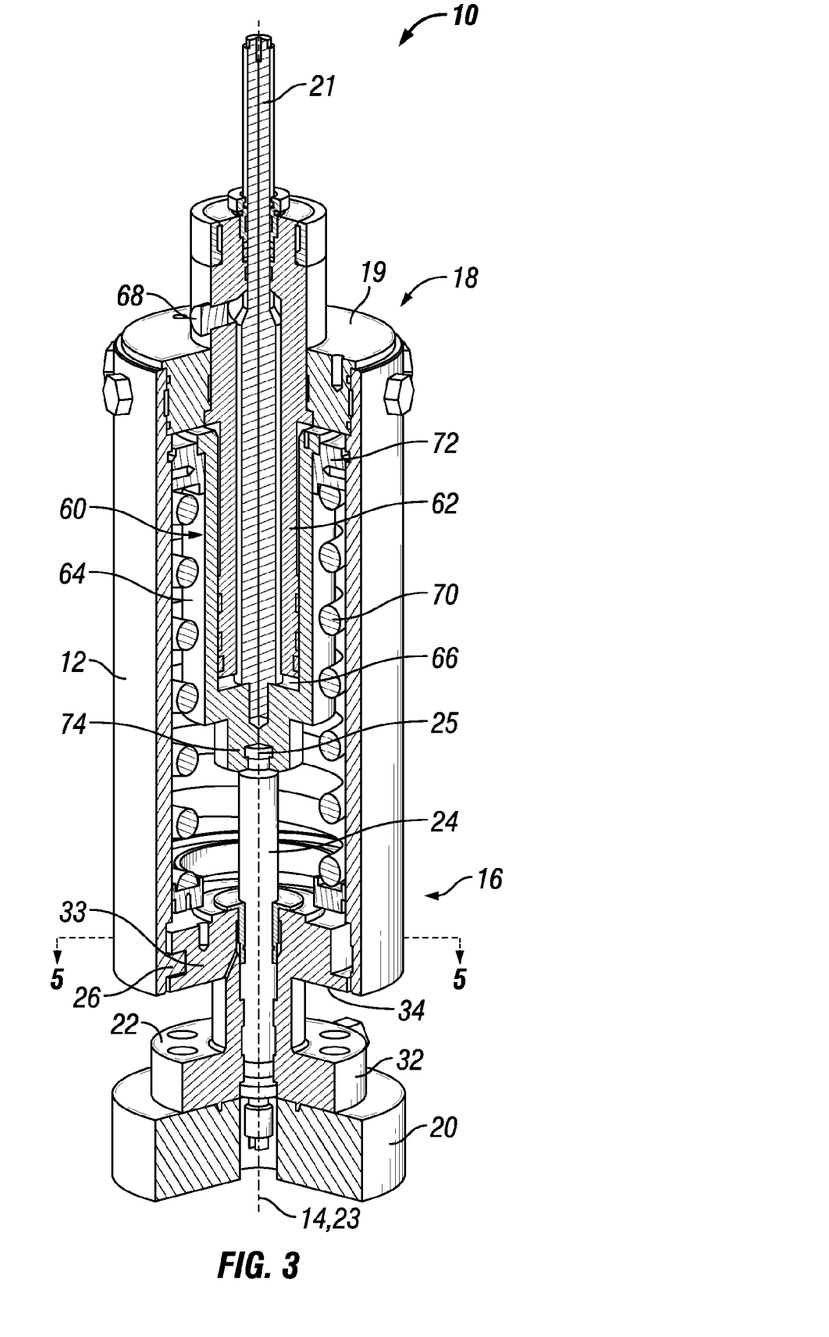
FIG. 3 is a quarter section perspective view of a quick connectable actuator of in accordance with an embodiment of this disclosure, shown with the quick connectable actuator connected to the valve stem and to the bonnet.

Referring to FIG. 1, actuator 10 includes actuator housing 12. Actuator housing 12 can be a generally cylindrical member with a bore or an open interior. Actuator housing 12 has actuator axis 14. Actuator housing 12 is manufactured from any of a variety of techniques including, for example, stamping, extrusion, and casting. In embodiments, actuator housing 12 is free of welds or seams on interior surfaces. Actuator housing 12 can be manufactured from NACE certified materials. Actuator housing 12 has valve end 16 for attaching to a valve 20 (FIG. 3) and an opposite outer end 18. Valve end 16 is an open end and outer end 18 is a closed end. The closed end can have a generally flat cap 19 (FIG. 1) or a cap 19 that provides for an axial extension for housing an indicator stem 21 (FIG. 3). In alternate embodiments, instead of bolting cap 19 to actuator housing 12, a system of lugs, as described herein for attaching valve end 16 of actuator housing 12 to the bonnet 22 and as described in U.S. application Ser. No. 14/949,324, can be used to attach cap 19 to outer end 18 of actuator housing 12. In such an embodiment, the entire actuator assembly can be assembled and secured to bonnet 22 and valve stem 24 of a valve without the use of any hand tools.

Actuator 10 is used to open or close valve 20, to which quick connectable actuator 10 is connected. Valve 20 can be, for example, associated with a wellhead assembly that is disposed over a well (not shown). The wellhead assembly can include a wellhead housing, a production tree over the housing, and flow lines connected to the tree or the wellhead assembly. The flow lines and wellhead assembly can include embodiments of valve 20 described herein. Valve 20 can also be used for regulating fluids that communicate with the wellhead assembly, or for regulating well and other fluids that are otherwise travelling along a pipeline. As one of skill in the art will appreciate, valve 20 can be a gate valve or any other type of valve that is actuated by the extension of a linear member.

Looking at FIG. 3, bonnet 22 is connected to the body of valve 20. Bonnet 22 and valve 20 prevent the flow of fluid from valve 20 to actuator 10. In other words, there is an absence of fluid communication between valve 20 and actuator 10. In embodiments, actuator housing 12 can be removed from bonnet 22 while fluid is present in valve 20 and no fluid will flow out of valve 20 through bonnet 22 or otherwise.

Valve stem 24 passes through bonnet 22 and has a stem axis 23. Valve stem 24 has a first portion with valve stem nub 25 and with a second portion operable to be connected to a valve member, such as a gate, of valve 20. Valve stem 24 moves axially between an extended position (FIG. 2) and a retracted position (FIG. 3) to actuate valve 20 and move the valve member between the open and closed position. Actuator 10 is used to actuate valve 20 by moving the valve stem 24 axially. Actuator 10, valve 20, bonnet 22, and each of their respective components make up the valve assembly.

Figure 5:
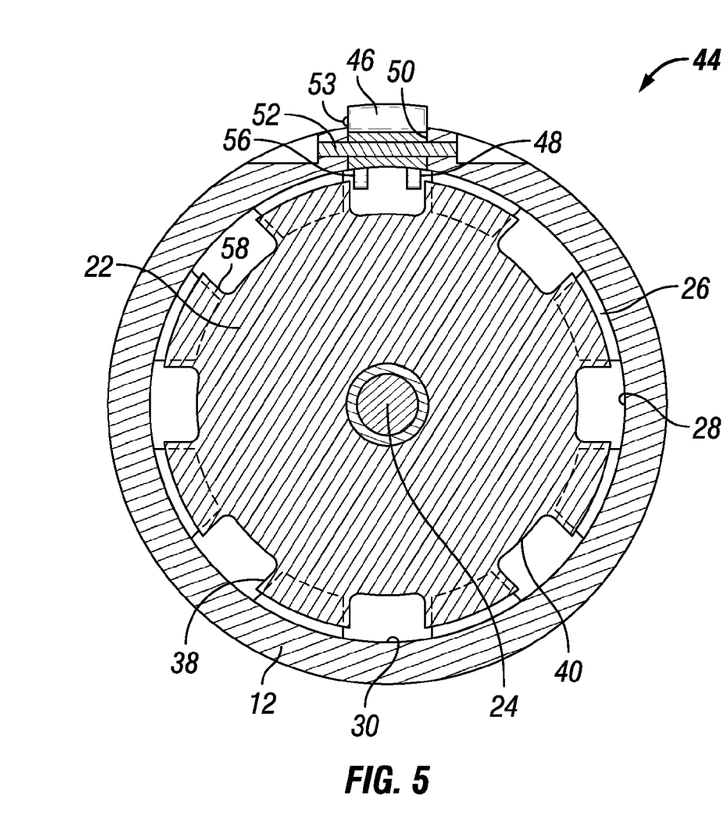
FIG. 5 is section plan view of a quick connectable actuator rotated into an engaged position relative to the bonnet, in accordance with an embodiment of this disclosure.

Looking at FIG. 5, a plurality of housing lugs 26 protrude radially inward from inner diameter surface 28 of actuator housing 12. Housing lugs 26 are spaced apart around a circumference of inner diameter surface 28 to define housing slots 30 therebetween.

Bonnet 22 has lower flange 32 extending radially outward. Lower flange 32 can be used to connect bonnet 22 to the body of valve 20. At the opposite end of bonnet 22 from lower flange 32, locking flange 34 extends radially from bonnet 22 and includes top surface 36. The outer diameter of locking flange 34 is less than or about equal to the inner diameter surface 28 of actuator housing 12 such that inner diameter surface 28 of actuator housing 12 can fit over locking flange 34.

A plurality of bonnet lugs 38 are spaced apart around a circumference of bonnet 22. Bonnet lugs 38 protrude radially inward from bonnet 22 to define a plurality of bonnet slots 40 therebetween. Each of the housing lugs 26 are sized to pass axially through a respective one of the bonnet slots 40 when actuator housing 12 is in a released position. That is, the circumferential arc length of each bonnet slot 40 is at least equal to or greater than the circumferential arc length of housing lugs 26. Bonnet lugs 38 are spaced axially apart from locking flange 34 so that groove 42 (FIG. 6) is defined between a bottom surface of bonnet lugs 38 and top surface 36 of locking flange 34. Groove 42 is an annular groove. The axial height of groove 42 is greater than or about equal to the axial height of housing lugs 26, measured along actuator axis 14.

Housing lugs 26, thus, are able to pass axially through bonnet slots 40. After passing through bonnet slots 40, housing lugs 26 are positioned in groove 42 below bonnet lugs 38. In the released position, housing lugs 26 are not axially aligned with bonnet lugs 38 but instead housing lugs 26 remain axially aligned with bonnet slots 40. Housing lugs 26 contact or rest upon top surface 36 of locking flange 34, thus preventing further downward movement of actuator housing 12 relative to bonnet 22. Because housing lugs 26 are axially below bonnet lugs 38, actuator housing 12 can rotate relative to bonnet 22. When actuator housing 12 rotates, relative to bonnet 22, to a position wherein at least a portion of bonnet lugs 38 are axially above housing lugs 26, such that bonnet lugs 38 prevent axial movement of actuator housing 12 in at least one direction, actuator housing 12 is in a locked position. In the locked position, bonnet lugs 38 prevent upward axial movement of housing lugs 26.

In certain embodiments, less than one revolution of actuator housing 12 is required to move actuator housing 12 from the released to the locked position. In embodiments, actuator housing 12 can move as little as ½, ⅓, ¼, ⅙, ⅛, 1/10, or 1/16, of a revolution, depending on the size and number of lugs, to move from the released to the locked position. As one of skill in the art will appreciate, no fluid from valve 20 is in the vicinity of bonnet lugs 38 and housing lugs 26 and, thus, there can be an absence of seals between the lower end of actuator housing 12 and the upper end of bonnet 22.

Figure 6:
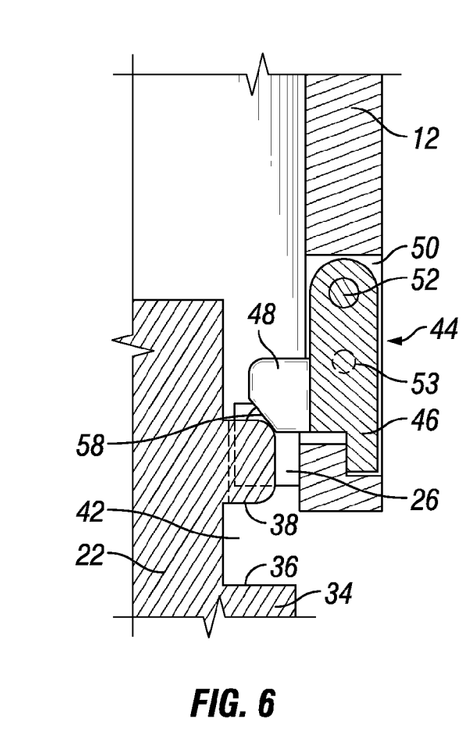
FIG. 6 is a detailed sectional view of the latch assembly in accordance with an embodiment of this disclosure, shown as the actuator housing is being attached to the bonnet.
Figure 7:
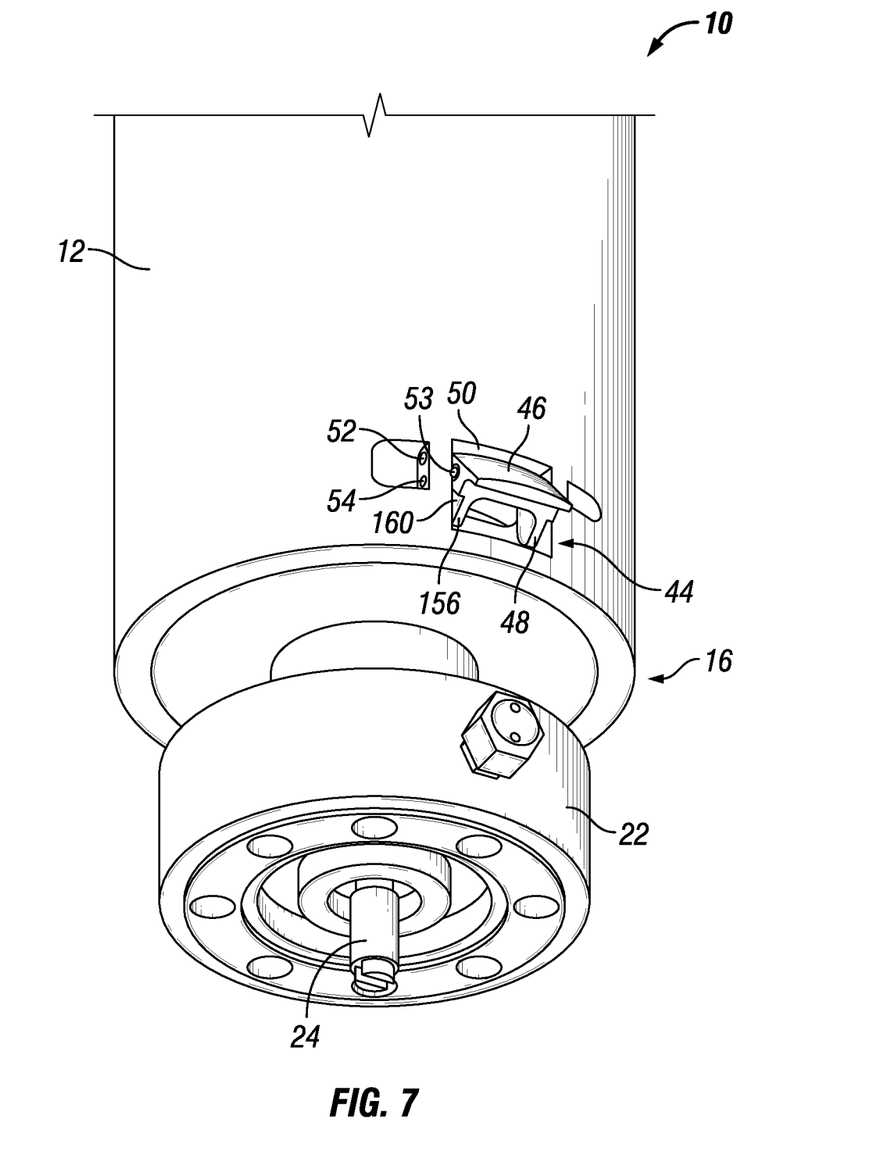
FIG. 7 is a perspective view of a quick connectable actuator shown connected to the bonnet in accordance with an embodiment of this disclosure, shown with a securing mechanism in an unlatched position.

Looking at FIGS. 5-7, securing mechanism 44 can prevent rotation of actuator housing 12, relative to bonnet 22, when actuator housing 12 is in the locked position. In the example embodiments, securing mechanism 44 is a latch assembly with rotational lock that includes latch body 46 having one or more latch tabs 48 protruding inward therefrom when latch body is positioned in latch aperture 50. Latch aperture 50 is an opening through the sidewall of actuator housing 12. In embodiments, no seals are required at aperture 50 because there is an absence of pressurized fluid in actuator housing 12 proximate to aperture 50. Latch body 46 is pivotally connected to actuator housing 12 by pin 52, which passes through a lateral bore, or cross-drilled hole, of actuator housing 12. Latch body 46 pivots on pin 52 between an unlatched position and a latched position.

Detent 53 is a spring loaded plunger that protrudes from one or both sides of latch body 46. Detent 53 can move between an extended position when a greater amount of detent 53 protrudes from latch body 46 and a retracted position where a lesser amount of detent 53 protrudes from latch body 46. Detent 53 extends from latch body 46 and can engage lateral bore 54 of actuator housing 12 to selectively prevent latch body 46 from pivoting relative to actuator housing 12 when detent 53 is in the extended position. When detent 53 is in the retracted position, latch body 46 can pivot relative to actuator housing 12 to allow for relative rotational movement between bonnet 22 and actuator housing 12. When latch body 46 is pivoted radially outward from actuator housing 12, in the unlatched position, detent 53 contacts an outer diameter surface of actuator housing 12 to prevent latch body 46 from pivoting inward to the latched position (FIG. 5).

Latch tab 48 also includes tab sidewalls 56. Latch tab 48 is positioned in actuator housing 12 slightly above housing lugs 26, such that at least a portion of latch tab 48 is in the same axial location as bonnet lugs 38 when actuator housing 12 is landed on bonnet 22. In the latched position, latch tab sidewalls 56 engage the sidewalls 58 of bonnet lugs 38, thus preventing further rotation of actuator housing 12 in either direction relative to bonnet 22. The outer surface of latch tab 48 can be contoured with a radius that generally matches the outer diameter profile of actuator housing 12.

Looking at FIG. 6, a portion of latch tab 48, such as taper 59, contacts a top edge of bonnet lug 38 when actuator housing 12 is placed on bonnet 22. Latch tab 48 can be deflected outward as actuator housing 12 is moved further onto bonnet 22. The shape of taper 59 can facilitate such deflection. With latch tab 48 positioned radially outward from actuator housing 12, in the unlatched position, housing lugs 26 land on top surface 36 of locking flange 34 and actuator housing 12 can be rotated to the locked position. Looking at FIGS. 5 and 7, detent 53 holds latch tab 48 in the radially outward, unlatched position. An operator then depresses detent 53 to allow latch tab 48 to pivot inward to the latched position. When latch tab 48 pivots to a position where detent 53 is aligned with lateral bore 54, a portion of detent 53 is urged by an internal spring (not shown) into lateral bore 54. In this latched position, detent 53 engages lateral bore 54 to hold latch tab 48 in the latched position and thus prevent latch tab 48 from moving to the unlatched position. As noted, in the latched position, latch tab sidewalls 56 engage the sidewalls 58 of bonnet lugs 38, preventing further rotation of actuator housing 12 in either direction relative to bonnet 22.

In other embodiments, securing mechanism 44 can have alternate forms, such as those shown in U.S. application Ser. No. 14/949,324.

Looking at FIG. 1, cylinder assembly 60 is located within actuator housing 12. Cylinder assembly 60 includes inner cylinder 62 and outer cylinder 64. Inner cylinder 62 is static relative to the actuator housing 12. Inner cylinder 62 can be fixed or releasably secured to outer end of actuator housing 12. In the example of FIG. 1, inner cylinder 62 is secured to actuator housing 12 by way of cap 19. Inner cylinder 62 can be a generally tubular shaped member with a central bore centered around actuator axis 14. An end of inner cylinder 62 proximate to cap 19 can be closed and an opposite end of inner cylinder 62 can be open.

Outer cylinder 64 has an open end for receiving inner cylinder 62 and a closed opposite end. Outer cylinder 64 is axially moveable relative to actuator housing 12. Outer cylinder 64 circumscribes at least a portion of inner cylinder 62 and an outer diameter of inner cylinder 62 dynamically seals with an inner diameter of outer cylinder 64. Inner cylinder 62 can reciprocate in and out of a bore of outer cylinder 64 as outer cylinder 64 moves axially within actuator housing 12.

The inner bore of outer cylinder 64 and the inner bore of inner cylinder 62 together define a sealed piston chamber 66 within the interior of cylinder assembly 60. In this way, inner cylinder 62 and outer cylinder 64 can act as a piston assembly and outer cylinder 64 can move axially relative to inner cylinder 62 by changing the pressure of a pressure media within piston chamber 66. Injection port 68 provides a fluid flow path for injecting the pressure media from an exterior of actuator housing 12 to piston chamber 66 of the interior of cylinder assembly 60. Outer cylinder 64 moves axially within actuator housing 12 by a change of pressure within piston chamber 66 of cylinder assembly 60.

Biasing member 70 is located within actuator housing 12. Biasing member 70 has a first end that engages biasing retainer 72 of outer cylinder 64 and a second end that engages actuator housing 12. Biasing member 70 urges outer cylinder 64 in a direction towards outer end 18 of actuator housing 12 and away from housing lugs 26. In the example embodiments, biasing member 70 is a spring. In order to move outer cylinder 64 axially within actuator housing 12, the pressure media injected into piston chamber 66 acts on the closed end of outer cylinder 64 to cause outer cylinder 64 to overcome the spring force and move outer cylinder 64 towards valve end 16 of actuator housing 12 and towards housing lugs 26. If sufficient pressure media is vented out of piston chamber 66, biasing member 70 will move outer cylinder 64 back towards outer end 18 of actuator housing 12 and away from housing lugs 26. When valve stem 24 is attached to a valve member, this axial movement of outer cylinder 64 can move valve member linearly to move valve 20 between a valve open and a valve closed position.

Figure 4:
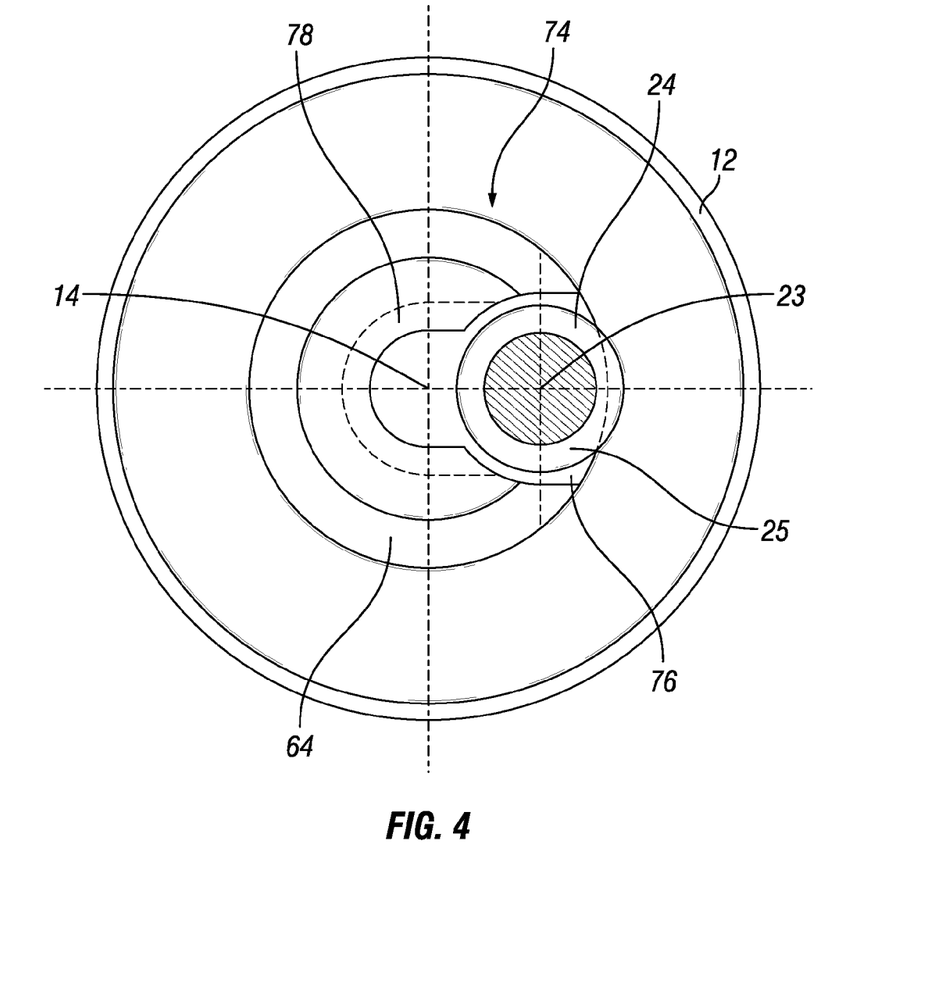
FIG. 4 is a section plan view of the horseshoe connector of the outer cylinder of a quick connectable actuator in accordance with an embodiment of this disclosure, shown with the valve stem being inserted into the horseshoe connector.

Looking at FIG. 4, in order to attach valve stem 24 to an end of outer cylinder 64, outer cylinder 64 has horseshoe connector 74. Horseshoe connector 74 is a receptacle in an end of outer cylinder 64. Horseshoe connector 74 has horseshoe connector opening 76 and lip 78 adjacent to opening 76. Opening 76 can have a generally "U" or horseshoe shape in cross section. Opening 76 has a diameter sized to accept valve stem 24. A portion of opening 76 centered around actuator axis 14 is sized to accept a reduced diameter portion 77 of valve stem nub 25 when valve stem 24 is moved radially towards actuator axis 14.

When actuator axis 14 is aligned with stem axis 23 and valve stem nub 25 is located within opening 76, lip 78 can engage nub shoulder 80 of valve stem nub 25, so that axial movement of horseshoe connector 74 is transferred to axial movement of valve stem 24. Lip 78 has a larger diameter than the diameter of opening 76 around actuator axis 14 and nub shoulder 80 has a larger diameter than the reduced diameter portion 77 of valve stem nub 25 that is located within opening 76. In the example shown, there is a single reduced diameter portion 77 and a single nub shoulder 80. In alternate embodiments, there can be multiple reduced diameter portions 77 and multiple nub shoulders 80. The multiple nub shoulders 80 can be spaced axially apart at various intervals and have various sizes or diameters and can be used to share the loads transferred between outer cylinder 64 and valve stem 24.

Figure 2:
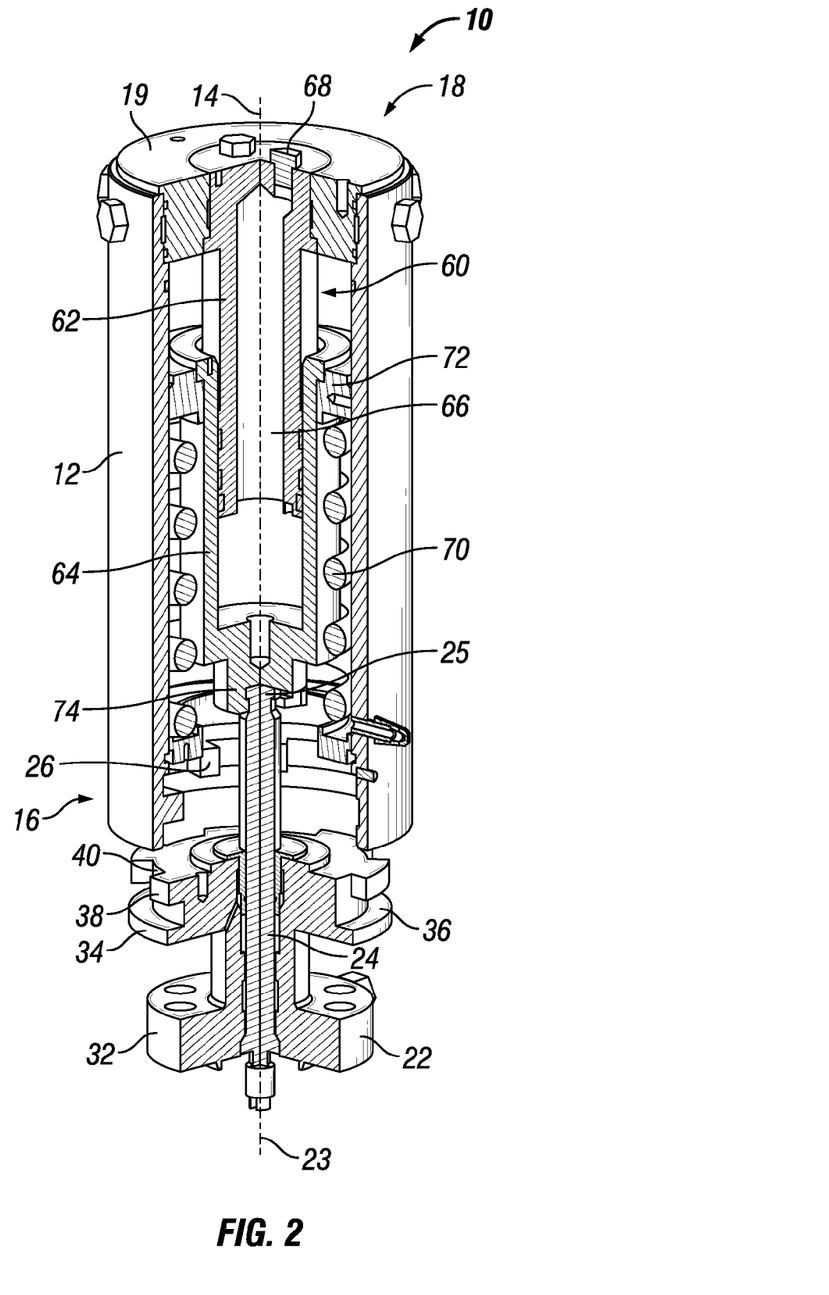
FIG. 2 is a quarter section perspective view of the quick connectable actuator of FIG. 1, shown with the quick connectable actuator connected to the valve stem and unattached from the bonnet.

Looking at FIGS. 1-2, in an example of operation, in order to secure actuator 10 to a valve assembly, valve stem 24 can first be attached to outer cylinder 64. In order to locate horseshoe connector 74 proximate valve end 16 of actuator housing 12, pressure media can be injected through injection port 68 into cylinder assembly 60 to move outer cylinder 64 in a direction towards housing lugs 26. Valve stem nub 25 of the first portion of valve stem 24 can be located within opening 76 by aligning valve stem nub 25 axially with horseshoe connector 74 and sliding valve stem nub 25 radially so that reduced diameter portion 77 of valve stem nub 25 enters into the opening 76. Valve stem 24 can be slid radially so that stem axis 23 aligns with actuator axis 14 and nub shoulder 80 of valve stem nub 25 engages lip 78 of horseshoe connector 74.

Looking at FIGS. 2-3, after outer cylinder 64 is attached to valve stem 24, the pressure media can be vented from piston chamber 66 and biasing member 70 will push outer cylinder 64 towards outer end 18 of actuator housing 12. This will pull valve stem 24 towards outer end 18 of actuator housing 12. Valve stem 24 has an annular shoulder that faces towards the first end and valve stem nub 25 of valve stem 24 and that is sized to engage a mating shoulder of bonnet 22, the engagement limiting axial movement of valve stem 24 relative to bonnet 22. The engagement of the annular shoulder of valve stem 24 and mating shoulder of bonnet 22 will cause bonnet 22 to also move towards outer end 18 of actuator housing 12, drawing bonnet 22 towards and into actuator housing 12.

Bonnet 22 can be drawn into actuator housing 12 with housing lugs 26 passing axially through bonnet slots 40, until housing lugs 26 contact or rest upon top surface 36 of locking flange 34, thus preventing further downward movement of actuator housing 12 relative to bonnet 22. Actuator housing 12 can then be rotated relative to bonnet 22 to a locked position. In the locked position, bonnet lugs 38 prevent upward axial movement of housing lugs 26. In certain embodiments, actuator housing rotates less than one full rotation between the released and locked positions. After actuator housing 12 is rotated to the locked position securing mechanism 44 can be latched to prevent rotation of actuator housing 12 relative to bonnet 22 so that actuator 10 cannot be removed from bonnet 22. Therefore the compound connections (referring to both the connection of actuator housing 12 to bonnet 12, and to the connection of valve stem 24 to outer cylinder 64) actuator 10 can be expressly connected without the use of tools. Compared to the assembly of some current actuator assemblies, the assembly of actuator 10 disclosed herein can be quick, efficient, and tool-less.

If an operator wishes to remove actuator 10 from bonnet 22, securing mechanism 44 can be unlatched and actuator housing 12 can be rotated relative to bonnet 22 until housing lugs 26 are rotationally aligned with bonnet slots 40. Actuator housing 12 can then be lifted axially from bonnet 22 with housing lugs 26 passing axially through bonnet slots 40. When actuator housing 12 is removed from bonnet 22, piston chamber 66 remains as a fluid sealed body and actuator 10 is independent of any operating fluids passing though valve 20.

The present disclosure described herein, therefore, is well adapted to carry out the objects and attain the ends and advantages mentioned, as well as others inherent therein. While example embodiments of the disclosure have been given for purposes of disclosure, numerous changes exist in the details of procedures for accomplishing the desired results. These and other similar modifications will readily suggest themselves to those skilled in the art, and are intended to be encompassed within the spirit of the present disclosure disclosed herein and the scope of the appended claims.

What is claimed is:

1. A system for securing a valve actuator to a valve assembly, the system comprising:
   an actuator housing having an actuator axis, and a plurality of housing lugs spaced apart around a circumference of the actuator housing, the plurality of housing lugs protruding radially toward the actuator axis to define a plurality of housing slots therebetween;
   a valve stem, a first portion of the valve stem having a valve stem nub with a nub shoulder, and a second portion of the valve stem operable to be connected to a valve;
   a cylinder assembly located within the actuator housing, the cylinder assembly having a horseshoe connector with a horseshoe connector opening and a lip adjacent to the opening, the lip sized to engage the nub shoulder, transferring axial movement of the horseshoe connector to axial movement of the valve stem when the valve stem is positioned within the horseshoe connector opening;
   a bonnet having a plurality of bonnet lugs spaced apart around a circumference of the bonnet, the plurality of bonnet lugs protruding radially from the bonnet to define a plurality of bonnet slots therebetween, wherein each of the plurality of housing lugs are sized to pass axially through a respective one of the plurality of bonnet slots when the actuator housing is in a released position, the actuator housing being rotatable to a locked position where at least a portion of one or more of the plurality of housing lugs is axially aligned with a portion of a respective bonnet lug such that the plurality of bonnet lugs prevent axial movement of the actuator housing in at least one direction, and rotation to the locked position secures the housing to the bonnet via the respective lugs while maintaining an axial position of the housing relative to the bonnet.

2. The system according to claim 1, wherein the plurality of housing lugs and the plurality of bonnet lugs are spaced so that the actuator housing is rotatable less than one full revolution between the released and locked positions.

3. The system according to claim 1, further comprising a securing mechanism selectively preventing relative rotation between the actuator housing and the bonnet.

4. The system according to claim 1, wherein the horseshoe connector opening has a diameter sized to accept a reduced diameter portion of the valve stem nub when the valve stem is moved radially towards the actuator axis.

5. The system according to claim 1, wherein the cylinder assembly includes an inner cylinder that is static relative to the actuator housing and an outer cylinder that is axially moveable relative to the actuator housing, and wherein the horseshoe connector is located at an end of the outer cylinder.

6. The system according to claim 1, wherein the cylinder assembly includes an inner cylinder and an outer cylinder, the outer cylinder having an open end for receiving the inner cylinder and a closed opposite end, and wherein an outer diameter of the inner cylinder dynamically seals with an inner diameter of outer cylinder.

7. The system according to claim 1, further comprising an injection port providing a fluid flow path for injecting a pressure media from an exterior of the actuator housing to an interior of the cylinder assembly, the horseshoe connector being axially moveable with a change in a pressure within the interior of the cylinder assembly.

8. The system according to claim 1, wherein the valve stem has an annular shoulder that faces towards the first portion of the valve stem that is sized to engage a mating shoulder of the bonnet, limiting axial movement of the valve stem relative to the bonnet.

9. A system for securing a valve actuator to a valve assembly, the system comprising:
   an actuator housing having an actuator axis, a valve end and an opposite outer end, and a plurality of housing lugs spaced apart around a circumference of the actuator housing, the plurality of housing lugs protruding radially toward the actuator axis to define a plurality of housing slots therebetween;
   a valve stem, a first portion of the valve stem having a valve stem nub with a nub shoulder, and a second portion of the valve stem operable to be connected to a valve;
   a cylinder assembly located within the actuator housing, the cylinder assembly having an inner cylinder sealingly engaging an outer cylinder, the outer cylinder axially moveable relative to the inner cylinder by a change of pressure within a piston chamber of cylinder assembly;
   a horseshoe connector located at an end of the outer cylinder, the horseshoe connector having a horseshoe connector opening and a lip adjacent to the opening, the lip sized to engage the nub shoulder, transferring axial movement of the horseshoe connector to axial movement of the valve stem when the valve stem is positioned within the horseshoe connector opening;
   a bonnet connectable to the valve end of the actuator housing and having a plurality of bonnet lugs spaced apart around a circumference of the bonnet, the plurality of bonnet lugs protruding radially from the bonnet to define a plurality of bonnet slots therebetween, wherein each of the plurality of housing lugs are sized to pass axially through a respective one of the plurality of bonnet slots when the actuator housing is in a released position, the actuator housing being rotatable to a locked position while maintaining an axial position of the housing relative to the bonnet where at least a portion of one or more of the plurality of housing lugs is axially aligned with a portion of a respective bonnet lug such that the plurality of bonnet lugs prevent axial movement of the actuator housing in at least one direction when the actuator housing is in the locked position.

10. The system according to claim 9, further comprising a biasing member with a first end that engages a biasing retainer of the outer cylinder and a second end that engages the actuator housing, the biasing member urging the outer cylinder in a direction towards the outer end of the actuator housing.

11. The system according to claim 9, wherein the inner cylinder is fixed to the outer end of the actuator housing and the outer cylinder is axially moveable relative to the actuator housing.

12. The system according to claim 9, wherein the outer cylinder has an open end for receiving the inner cylinder and a closed opposite end, and wherein an outer diameter of the inner cylinder dynamically seals with an inner diameter of outer cylinder and an inner bore of the inner cylinder and an inner bore of the outer cylinder together define a piston chamber.

13. A method for securing a valve actuator to a valve assembly, the method comprising:
    providing an actuator housing having an actuator axis, a plurality of housing lugs spaced apart around a circumference of the actuator housing, the plurality of housing lugs protruding radially to define a plurality of housing slots therebetween, and a cylinder assembly located within the actuator housing, the cylinder assembly having a horseshoe connector;
    locating a valve stem nub of a first portion of a valve stem within a horseshoe connector opening of the horseshoe connector so that a lip adjacent to the horseshoe connector opening engages a nub shoulder of the valve stem nub and axial movement of the horseshoe connector can be transferred to axial movement of the valve stem, the valve stem having a second portion operable to be connected to a valve;
    providing a bonnet having a plurality of bonnet lugs spaced apart around a circumference of the bonnet, the plurality of bonnet lugs protruding radially from the bonnet to define a plurality of bonnet slots therebetween; and
    passing the plurality of housing lugs through the plurality of bonnet slots and rotating the actuator housing from a released position to a locked position while maintaining an axial position of the housing lugs relative to the bonnet lugs where at least a portion of one or more of the plurality of housing lugs is axially aligned with a portion of a respective bonnet lug such that the plurality of bonnet lugs prevent axial movement of the actuator housing in at least one direction.

14. The method according to claim 13, wherein the cylinder assembly includes an inner cylinder that is static relative to the actuator housing and an outer cylinder that is axially moveable relative to the actuator housing, and wherein the horseshoe connector is located at an end of the outer cylinder, the method further including before locating the valve stem nub of the first portion of the valve stem within the horseshoe connector opening of the horseshoe connector, injecting a pressure media into the cylinder assembly to move the outer cylinder in a direction towards the plurality of housing lugs.

15. The method according to claim 13, wherein locating the valve stem nub of the first portion of the valve stem within the horseshoe connector opening of the horseshoe connector includes aligning the valve stem nub axially with the horseshoe connector and sliding the valve stem nub radially so that a reduced diameter portion of the valve stem nub enters into the horseshoe connector opening.

16. The method according to claim 13, wherein the cylinder assembly includes an inner cylinder that is static relative to the actuator housing and an outer cylinder that is axially moveable relative to the actuator housing, the method further including before passing the plurality of housing lugs through the plurality of bonnet slots, venting a pressure media from the cylinder assembly to move the outer cylinder in a direction away from the plurality of housing lugs, drawing the bonnet towards the actuator housing.

17. The method according to claim 13, wherein rotating the actuator housing to the locked position includes rotating the actuator housing less than one full revolution to move the actuator housing from the released position to the locked position.

18. The method according to claim 13, further comprising preventing relative rotation between the actuator housing and the bonnet with a securing mechanism.

19. The method according to claim 13, further comprising rotating the actuator housing relative to the bonnet to move the actuator housing from the locked position to the released position and removing the actuator housing from the bonnet while maintaining a pressure sealed piston chamber within the actuator housing.

20. The method of claim 13, wherein the cylinder assembly includes an inner cylinder that is static relative to the actuator housing and an outer cylinder that is axially moveable relative to the actuator housing, the method further including urging the outer cylinder in a direction away from the plurality of housing lugs with a biasing member having a first end that engages a biasing retainer of the outer cylinder and a second end that engages the actuator housing.

21. The method of claim 13, wherein each of the steps for securing the valve actuator to the valve assembly are performed without a tool.

* * * * *